(12) United States Patent
Gao

(10) Patent No.: US 8,785,798 B2
(45) Date of Patent: Jul. 22, 2014

(54) SLIDING KEY MODULE ON AN ELECTRONIC DEVICE

(75) Inventor: Yan-Ling Gao, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 141 days.

(21) Appl. No.: 13/400,859

(22) Filed: Feb. 21, 2012

(65) Prior Publication Data

US 2013/0140161 A1 Jun. 6, 2013

(30) Foreign Application Priority Data

Dec. 6, 2011 (CN) .......................... 2011 1 0400567

(51) Int. Cl.
*H01H 15/00* (2006.01)

(52) U.S. Cl.
USPC .......................................... 200/537; 200/547

(58) Field of Classification Search
USPC .................................................. 200/537, 547
IPC ...................................................... H01H 15/00
See application file for complete search history.

(56) References Cited

U.S. PATENT DOCUMENTS 6,084,192 A * 7/2000 Honma .......................... 200/547

* cited by examiner

*Primary Examiner* — Vanessa Girardi

(74) *Attorney, Agent, or Firm* — Novak Druce Connolly Bove + Quigg LLP

(57) ABSTRACT

A sliding key module includes a main body, two opposite hooks projecting from the main body and a sliding key. Each hook includes a latch and a guiding portion connecting the latch and the main body. The latches, the guiding portions and the main body cooperatively define a sliding channel. The sliding key includes a first sliding track slidably mounted in the sliding channel. The first sliding track is pressed to mount in the sliding channel through the gap between the latches.

12 Claims, 4 Drawing Sheets

SLIDING KEY MODULE ON AN ELECTRONIC DEVICE

BACKGROUND

1. Technical Field

The disclosure generally relates to sliding key modules and electronic devices using the sliding key modules.

2. Description of the Related Art

Electronic devices such as mobile phones may include a housing and a sliding key module mounted on the housing for performing functions including activating the mobile phone for operations. However, the structure of the sliding key module can be complicated and difficult to mount to the housing.

Therefore, there is room for improvement within the art.

BRIEF DESCRIPTION OF THE DRAWINGS

Many aspects of the exemplary sliding key module and electronic device can be better understood with reference to the following drawings. The components in the various drawings are not necessarily drawn to scale, the emphasis instead being placed upon clearly illustrating the principles of the exemplary sliding key module and electronic device. Moreover, in the drawings, like reference numerals designate corresponding parts throughout the diagrams.

DETAILED DESCRIPTION

Figure 1:
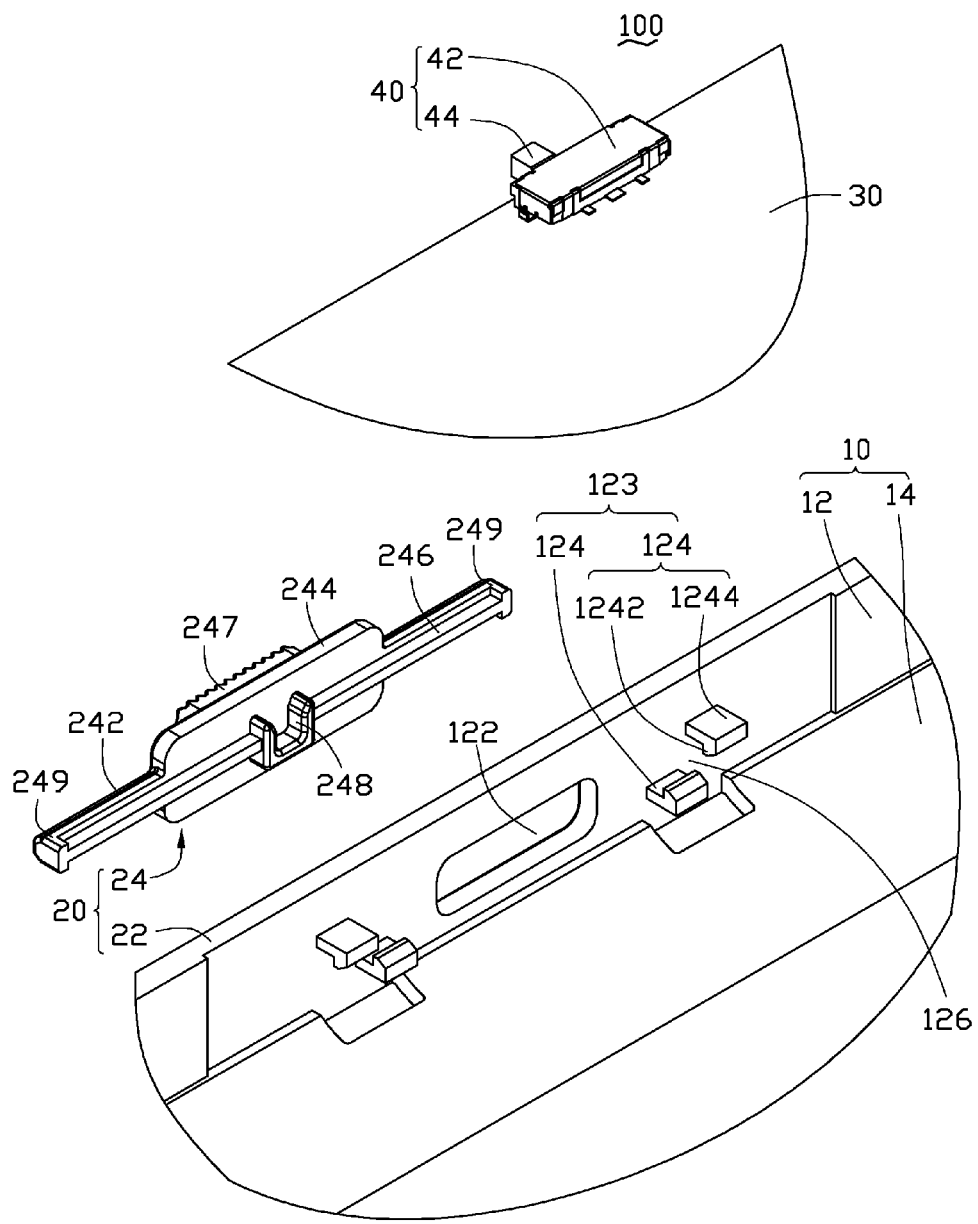
FIG. 1 is an exploded view of the electronic device using the sliding key module according to an exemplary embodiment.

FIG. 1 shows an exemplary electronic device 100 including a cover 10, a sliding key module 20, a Printed Circuit Board (PCB) 30 and a triggering member 40. The housing 10 includes a side wall 12 and a bottom wall 14 connecting the side wall 12. The side wall 12 defines a through hole 122 and two latching modules 123. The through hole 122 is located between the latching modules 123. Each latching module 123 includes two hooks 124.

Each hook 124 includes a latch 1242 and a guide portion 1244 connecting the latch 1242 and the side wall 12. The guide portions 1244 are parallelly staggered in each latching module 123. Each latching module 123 defines a sliding channel 126 among the guide portions 1244, the latches 1242 and the side wall 12. The sliding channels 126 communicate with each other. Each latching module 123 defines a guide channel 128 between the opposite latches 1242 (best shown in FIG. 4). The guide channels 128 communicate with each other.

The sliding key module 20 includes a main body 22 and a sliding key 24 slidably mounted on the main body 22. In this exemplary embodiment, the main body 22 is a portion of the cover 10. The side wall 12, the through hole 122 and the hooks 124 are portions of the main body 22.

The sliding key 24 includes a first sliding track 242, a board portion 244 fixed to the first sliding track 242, a second sliding track 246 fixed on the first sliding track 242. In addition, a protruding portion 247 projecting from the board portion 244, a fastening portion 248 defined on the second sliding track 246 and two limiting portions 249 fixed on each end of the first sliding track 242. The first sliding track 242 is slidably mounted in the sliding channels 126. The second sliding track 246 is slidably mounted in the guide channels 128. The cross-section of the first track 242 is larger than the second track 246. The protruding portion 247 is slidably mounted in the through hole 122 of the cover 10. The protruding portion 247 extends the through hole 122 for driving the protruding portion 247 to move in the through hole 122. In this exemplary embodiment, the fastening portion 248 is a slot to fasten the sliding key 24 to the triggering member 40. The limiting portions 249 resists against the hooks 124 to prevent the sliding key 24 from separating from the cover 10.

The triggering member 40 includes a triggering body 42 and a sliding portion 44 slidably mounted on the triggering body 42. The sliding portion 44 is fastened to the fastening portion 248. An external force can move the sliding portion 44 from one predetermined position to another predetermined position, acting as a switch for the electronic device 100.

Figure 2:
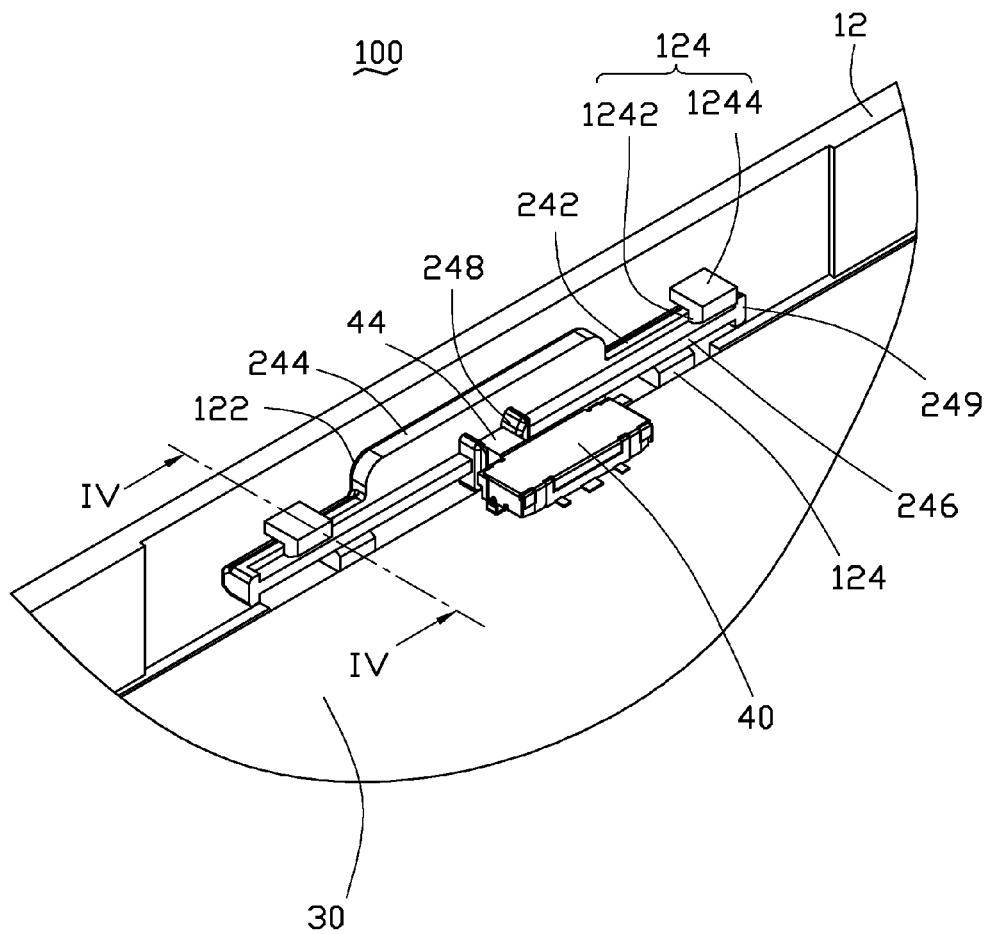
FIGS. 2 and 3 are assembled views of the electronic device shown in FIG. 1.
Figure 3:
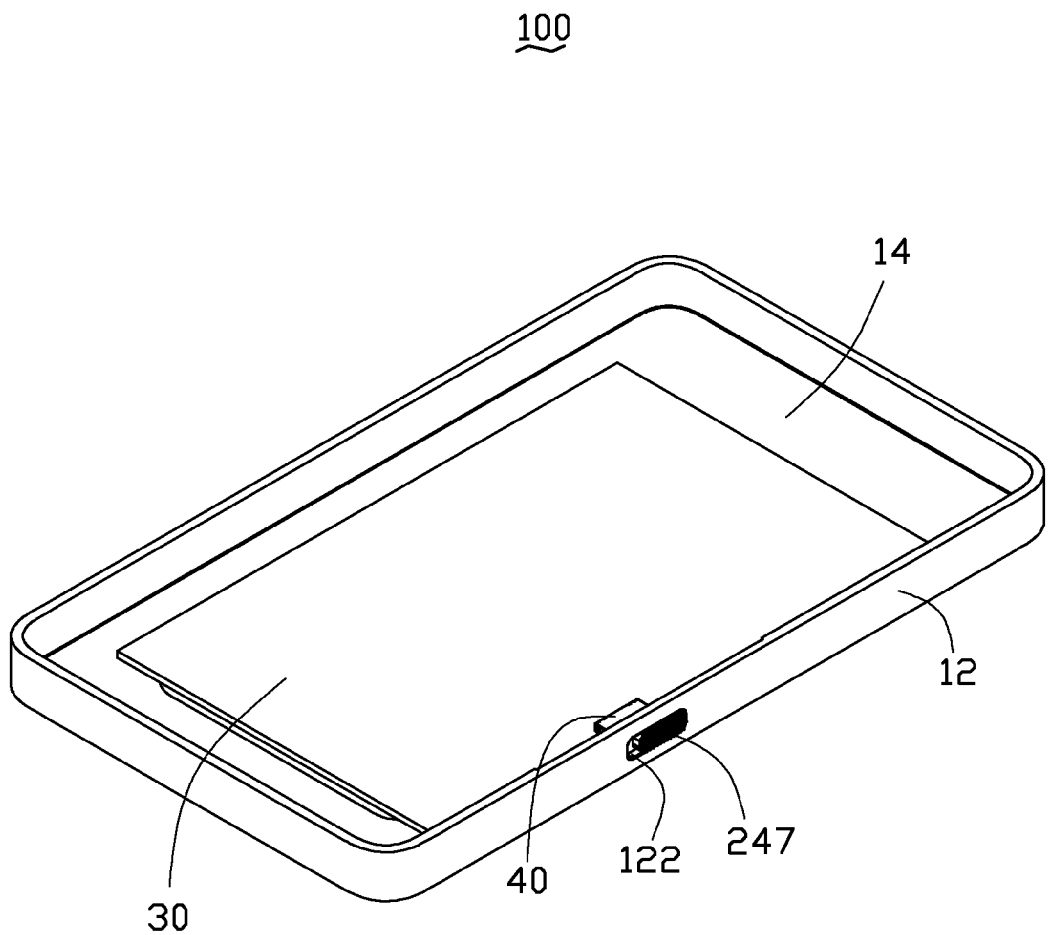
Figure 4:
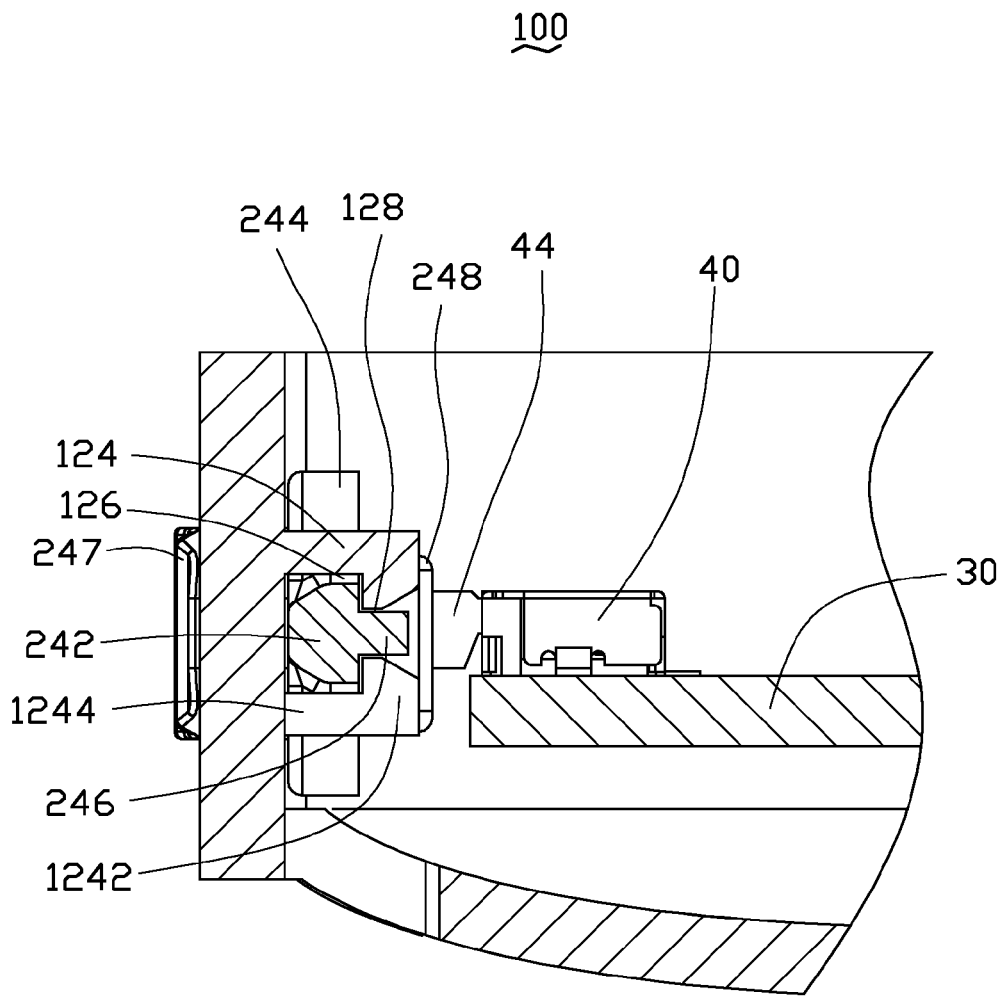
FIG. 4 is a cross-sectional view of the cover in FIG. 2, taken along line IV-IV.

In FIGS. 2-4, during assembly, an external force is provided to press the first sliding track 242 into the sliding channels 126, until the second sliding track 246 is mounted in the guide channels 128 and the protruding portion 247 is mounted in the through hole 122. The PCB 30 is mounted into the cover 10. The sliding portion 44 on the PCB 30 is fastened to the fastening portion 248.

In use, the protruding portion 247 is moved in the through hole 122 under an external force, which can drive the sliding portion 44 to slide relative to the triggering body 42.

It is to be understood, however, that even through numerous characteristics and advantages of the exemplary disclosure have been set forth in the foregoing description, together with details of the system and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A sliding key module, comprising:
   a main body comprising an inner surface, and defining a through hole;
   a first pair of hooks and a second pair of hooks projecting from the inner surface of the main body, the first pair of hook and the second pair of hooks positioned at two opposite sides of the through hole, the first pair of hooks separately spaced from each other, the second pair of hooks separately spaced from each other, each hook of the first pair of hooks comprising a latch and a guiding portion connecting the latch and the main body, the latches, the guiding portions and the main body cooperatively defining a first sliding channel; and
   a sliding key comprising a first sliding track slidably mounted in the first sliding channel, the first sliding track latched by the first pair of hooks, the first sliding track abutting against and sliding along the inner surface of the main body;
   the first sliding track configured to be pressed to mount in the first sliding channel through a gap between the latches;
   wherein the sliding key further comprises a second sliding track perpendicularly fixed to the first sliding track, the gap between the latches defines a guide channel, the second sliding track is slidably mounted in the guide channel, the sliding key module further comprises a triggering member, a fastening portion defined on the second sliding track, the fastening portion is a slot to fasten the sliding key to the triggering member; and wherein the sliding key comprises a board portion, the first sliding track extends from two opposite ends of the board portion, and the second sliding track extends from a side of the board portion.

2. The sliding key module as claimed in claim 1, wherein two limiting portions are fixed on two ends of the first sliding track, the limiting portions resist against the hooks to prevent the sliding key from separating from the main body.

3. The sliding key module as claimed in claim 1, wherein the sliding key slides parallel to the main body to move the fastening portion.

4. The sliding key module as claimed in claim 1, wherein the sliding key comprises a protruding portion fixing to the first sliding track, the protruding portion is mounted in the through hole to drive the first sliding track to move in the first sliding channel.

5. The sliding key module as claimed in claim 4, wherein the second pair of hooks define a second sliding channel communicated with the first sliding channel, the first sliding track is slidably mounted in the second sliding channel.

6. The sliding key module as claimed in claim 5, wherein the second sliding channel is formed among the main body, the latches and the guiding portions.

7. An electronic device, comprising:
a cover comprising an inner surface, and defining a through hole;
a first pair of hooks and a second pair of hooks projecting from the inner surface of the cover, the first pair of hook and the second pair of hooks positioned at two opposite sides the through hole, the first pair of hooks separately spaced from each other, the second pair of hooks separately spaced from each other, each hook of the first pair of hooks comprising a latch and a guiding portion connecting the latch and the cover, the latches, the guiding portions and the cover cooperatively defining a first sliding channel; and
a sliding key comprising a first sliding track slidably mounted in the first sliding channel the first sliding track configured to be pressed to mount in the first sliding channel through a gap between the latches;
wherein the first sliding track is latched by the first pair of hooks, the first sliding track abuts against and slides along the inner surface of the cover; and
wherein the sliding key further comprises a second sliding track perpendicularly fixed to the first sliding track, the gap between the latches defines a guide channel, the second sliding track is slidably mounted in the guide channel, the sliding key module further comprises a triggering member, a fastening portion defined on the second sliding track, the fastening portion is a slot to fasten the sliding key to the triggering member; and
wherein the sliding key comprises a board portion, the first sliding track extends from two opposite ends of the board portion, and the second sliding track extends from a side of the board portion.

8. The electronic device as claimed in claim 7, wherein the cover defines a through hole, the sliding key comprises a protruding portion fixing to the first sliding track, the protruding portion is mounted in the through hole to drive the first sliding track to move in the first sliding channel.

9. The electronic device as claimed in claim 8, wherein the second pair of hooks define a second sliding channel communicated communicate with the first sliding channel, the first sliding track is slidably mounted in the second sliding channel.

10. The electronic device as claimed in claim 9, wherein of the second pair of hooks comprises a latch and a guiding portion connecting the latch and the main body, the second sliding channel is formed among the main body, the latches and the guiding portions.

11. A sliding key module, comprising:
a main body comprising an inner surface, and defining a through hole;
two latching module projecting from the inner surface of the main body, and positioned at two opposite sides of the through hole, each latching module comprising two opposite hooks, each of the two opposite hooks separately spaced from each other, each hook comprising a latch and a guiding portion connecting the latch and the main body, the latches, the guiding portions and the main body cooperatively defining a sliding channel; and
a sliding key comprising a first sliding track slidably mounted in the sliding channel;
the first sliding track configured to be pressed to mount in the sliding channel through a gap between the latches;
wherein the first sliding track is latched by the first pair of hooks, the first sliding track abuts against and slides along the inner surface of the main body; and
wherein the sliding key further comprises a second sliding track perpendicularly fixed to the first sliding track, the gap between the latches defines a guide channel, the second sliding track is slidably mounted in the guide channel, the sliding key module further comprises a triggering member, a fastening portion defined on the second sliding track, the fastening portion is a slot to fasten the sliding key to the triggering member; and
wherein the sliding key comprises a board portion, the first sliding track extends from two opposite ends of the board portion, and the second sliding track extends from a side of the board portion.

12. The sliding key module as claimed in claim 11, wherein the main body defines a through hole between the latching modules, the sliding key comprises a protruding portion fixing to the first sliding track, the protruding portion is mounted in the through hole to drive the first sliding track to move in the first sliding channel.

\* \* \* \* \*